United States Patent
Madan et al.

(10) Patent No.: US 11,704,203 B2
(45) Date of Patent: *Jul. 18, 2023

(54) REPLICATION FOR CYBER RECOVERY FOR MULTIPLE TIER DATA

(71) Applicant: EMC IP Holding Company LLC, Hopkinton, MA (US)

(72) Inventors: Nitin Madan, Cupertino, CA (US); Kalyan C. Gunda, Bangalore (IN); Bhimsen Bhanjois, Fremont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,345

(22) Filed: Sep. 2, 2022

(65) Prior Publication Data
US 2023/0004466 A1    Jan. 5, 2023

Related U.S. Application Data

(63) Continuation of application No. 17/069,463, filed on Oct. 13, 2020, now Pat. No. 11,436,103.

(51) Int. Cl.
*G06F 16/27* (2019.01)
*G06F 11/14* (2006.01)

(52) U.S. Cl.
CPC ...... *G06F 11/1469* (2013.01); *G06F 11/1464* (2013.01); *G06F 16/27* (2019.01); *G06F 2201/84* (2013.01)

(58) Field of Classification Search
CPC .. G06F 11/1469; G06F 16/273; G06F 16/275; G06F 16/278; G06F 11/1464; G06F 16/27; G06F 2201/84; G06F 11/1446
See application file for complete search history.

(56) References Cited

U.S. PATENT DOCUMENTS

| | | | |
|---|---|---|---|
| 8,713,282 B1* | 4/2014 | Rajimwale | G06F 3/0644 711/173 |
| 9,026,499 B1* | 5/2015 | Rajimwale | G06F 16/972 707/674 |
| 9,383,936 B1* | 7/2016 | Freitas | G06F 3/0641 |
| 9,984,090 B1* | 5/2018 | Shang | G06F 16/13 |
| 9,990,253 B1* | 6/2018 | Rajimwale | G06F 11/1435 |
| 10,019,323 B1* | 7/2018 | Bai | G06F 11/1435 |
| 10,140,032 B1 | 11/2018 | Faibish et al. | |
| 10,229,127 B1 | 3/2019 | Shang et al. | |

(Continued)

*Primary Examiner* — Merilyn P Nguyen
(74) *Attorney, Agent, or Firm* — Workman Nydegger

(57) ABSTRACT

Replication of a filesystem or a mount point or share may replicate all data that it consists of irrespective of where the data is stored. Replication protects data irrespective of location. One method is to replicate the filesystem namespace as is while skipping the data outside of the appliance/machine so that replication cost and time are reasonable. The data outside of the machine, like cloud/tape data is protected differently. One example method includes a data protection operation configured to replication a namespace associated with multiple data tiers. During replication, data from one of the tiers is skipped while all of the namespace metadata is replicated. The recovery restores the namespace metadata and the data that was replicated from the other tier. This may be performed in connection with cyber security, for example when replicating multi-tier data to a vault.

18 Claims, 3 Drawing Sheets

(56) References Cited

U.S. PATENT DOCUMENTS

| | | | |
|---|---|---|---|
| 10,496,611 B1 | 12/2019 | Singh | |
| 10,664,190 B1 | 5/2020 | Hartford et al. | |
| 10,915,497 B1 | 2/2021 | Bono et al. | |
| 10,997,040 B1* | 5/2021 | Xu | G06F 11/1451 |
| 11,048,591 B1* | 6/2021 | Mamidi | G06F 16/2246 |
| 11,106,632 B2 | 8/2021 | Bangalore et al. | |
| 11,126,508 B2 | 9/2021 | Meadowcroft et al. | |
| 2014/0040182 A1 | 2/2014 | Gilder et al. | |
| 2015/0112944 A1 | 4/2015 | Wu et al. | |
| 2017/0277435 A1* | 9/2017 | Wadhwa | G06F 3/067 |
| 2017/0277597 A1* | 9/2017 | Dillon | G06F 11/1464 |
| 2018/0137139 A1 | 5/2018 | Bangalore et al. | |
| 2019/0235978 A1* | 8/2019 | Wu | G06F 11/2023 |
| 2019/0325059 A1* | 10/2019 | Fair | G06F 16/148 |
| 2020/0034245 A1* | 1/2020 | Kohler | G06F 11/1458 |
| 2020/0142970 A1 | 5/2020 | Madan et al. | |
| 2021/0019237 A1* | 1/2021 | Karr | G06F 11/1469 |
| 2021/0096776 A1* | 4/2021 | Kim | G06F 3/067 |
| 2021/0406136 A1* | 12/2021 | Venkatesh | G06F 11/1469 |

* cited by examiner

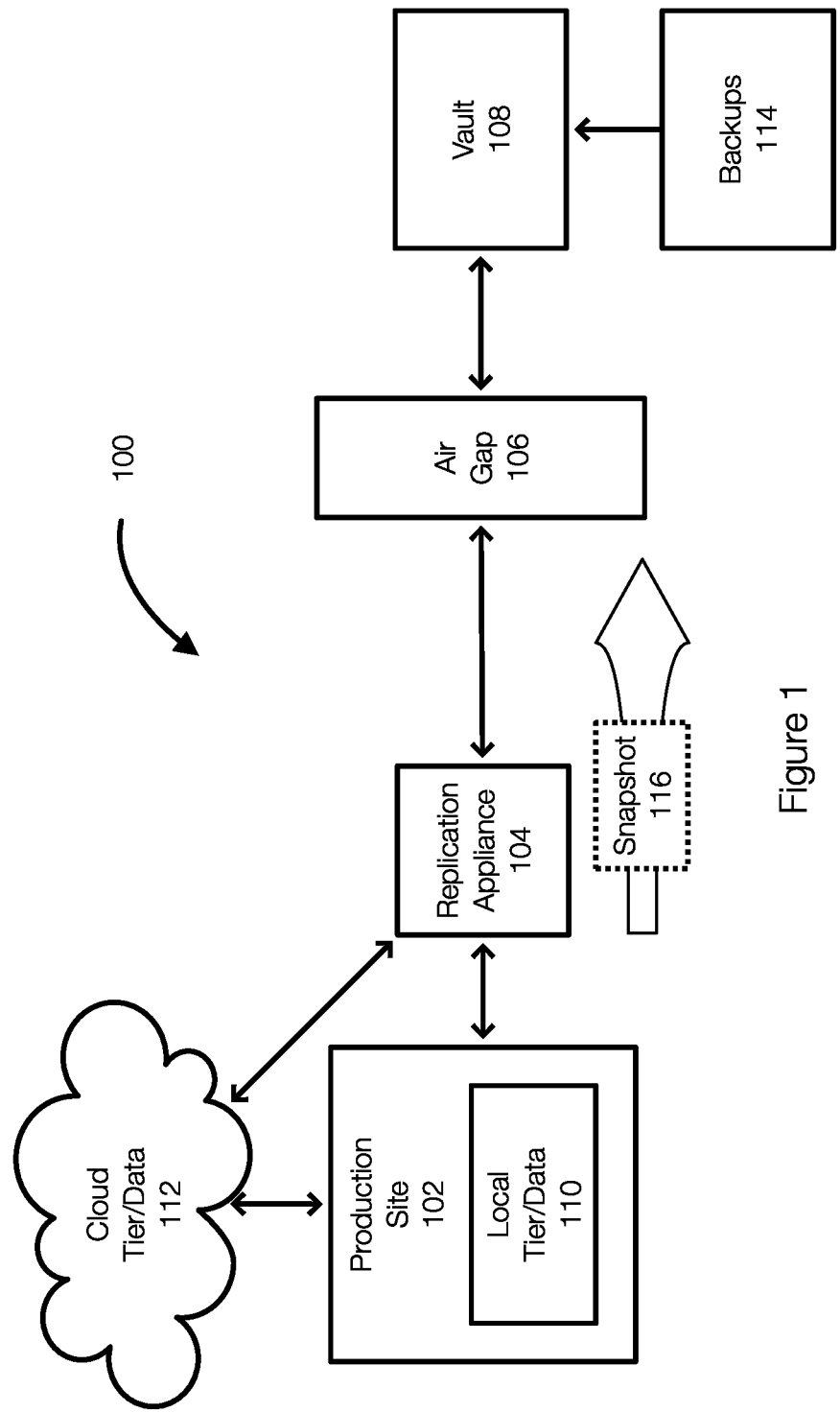

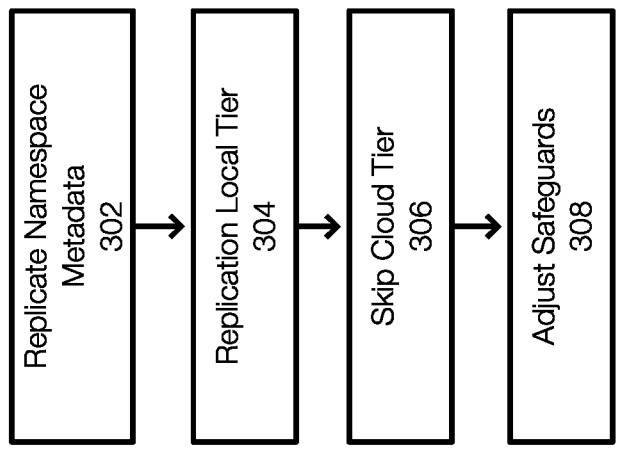
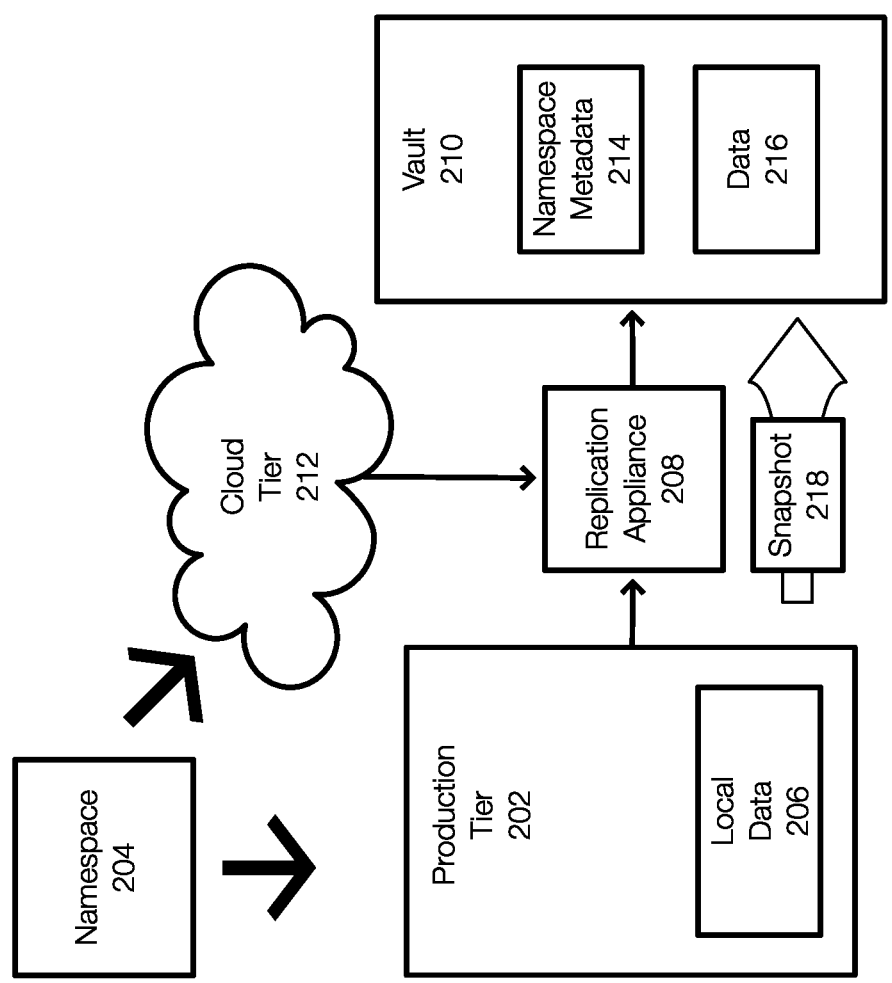

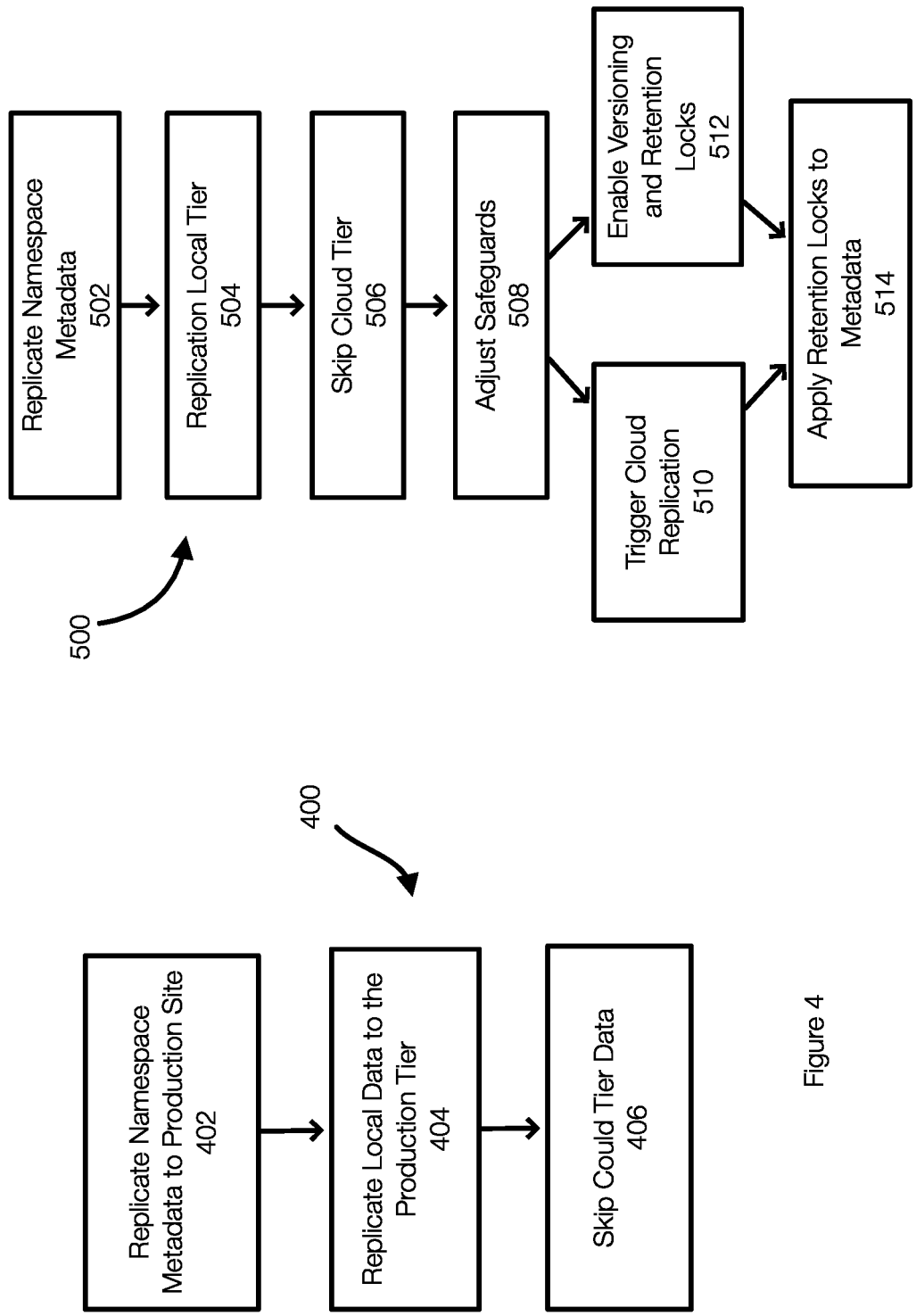

REPLICATION FOR CYBER RECOVERY FOR MULTIPLE TIER DATA

FIELD OF THE INVENTION

Embodiments of the present invention generally relate to data protection. More particularly, at least some embodiments of the invention relate to systems, hardware, software, computer-readable media, and methods for data protection operations including replication operations and cyber security operations.

BACKGROUND

Data protection is an import aspect of computing environments. If an entity fails to protect their data, any type of data loss can prove problematic or even catastrophic from the entity's perspective and from the perspective of their customers. Fortunately, there are many ways to protect data today and most entities have some form of data protection.

While many entities have data protection, there is still room for improvement for a variety of reasons. For example, not all entities store data in the same manner. For example, some entities may store all of their data locally. Other entities may use cloud-based storage or a hybrid storage arrangement. Further, the computing environment may also differ. Applications may be run using physical machines, virtual machines, or other arrangements. These arrangements, and others, can complicate data protection operations.

In addition, data protection systems may not simply protect from data corruption or data loss. Data protection systems may also need to consider and protect against cyber threats such as ransomware.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 discloses aspects of a computing environment that includes a data protection system configured to perform data protection operations;

FIG. 2 illustrates an example of a data protection operation performing data protection operations in a computing environment;

FIG. 3 illustrates an example of a method for performing a data protection operation that includes a replication operation;

FIG. 4 illustrates an example of a method for performing a data protection operation such as a recovery operation; and FIG. 5 illustrates an example of a method for performing a replication operation.

DETAILED DESCRIPTION OF SOME EXAMPLE EMBODIMENTS

Embodiments of the present invention generally relate to data protection and data protection operations. More particularly, at least some embodiments of the invention relate to systems, hardware, software, computer-readable media, and methods for data protection operations including, by way of example, backup operations, recovery operations, replication operations, vault operations, multi-tier data protection operations, cyber-recovery operations, security operations, or the like or combination thereof.

More specifically, example embodiments of the invention relate to replicating data that is stored on multiple tiers. Embodiments of the invention further relate to security operations to secure or protect the data from threats such as ransomware and other cyber threats. Embodiments of the invention may be implemented in, by way of example only, DELLEMC Data Domain and Retention Lock.

Replication, by way of example only, includes copying data from a source or production site to a target or destination site such that the backup copy is the same as the production copy. Replication may be implemented such that writes occurring at the production site are also written to the destination site. In one example, this is achieved using snapshots. When a snapshot of source data is taken, the snapshot copy or the data corresponding to the snapshot is written to the destination site. In one example, where snapshots are taken repeatedly over time, a snapshot may identify data that has changed since a prior snapshot. In this case, the replication time may be shorter because the amount of data that has changed is usually much less than the amount of data that has not changed and has already been replicated. A snapshot may also copy all data from the production site, at the time the snapshot was taken, to the destination site.

In one example, embodiments of the invention replicate production data to a target or destination. The target may be a vault that is configured to apply a retention lock to the replicated data. In other words, once the data from the source (the production site) is copied into the vault, the data can no longer be changed or deleted once the retention lock is applied. This protects the data against threats such as ransomware.

For example, source data may be attacked and modified. The operation of the data protection system may even replicate or copy the modified data to the vault. However, previous copies of the data are not changed at the vault because of the retention lock. This ensures that a valid and recent copy of the data is available based on various protection settings and other factors associated with the vault. In one example, the vault may have more than one copy. One copy may be subject to a retention lock and the other a replica of the source.

Embodiments of the invention further relate to protecting multi-tier data. For example, a production site may use data that is stored on a local or active tier and in a cloud tier. Embodiments of the invention include data protection operations for production data that may be stored in more than one tier such as a local tier and a cloud tier. The local tier may also be referred to as a production tier. Generally, the local or production tier is an on-premise tier that is distinct from data stored in a cloud tier.

FIG. 1 illustrates a data protection system that is configured to perform data protection operations for multiple tiers of data. FIG. 1 illustrates a replication appliance 104 (e.g., DELLEMC Data Domain) that is configured to perform data protection operations including replication operations. The replication appliance 104, which is an example of a data protection system, is configured to protect data, which may be organized in various manners and may include data, virtual machines, applications, or the like, associated with a production site 102. The production site 102 includes a local tier or local data 110 and a cloud tier or cloud data 112. In addition to performing replication operations, embodiments of the invention also include security operations to protect from cyber threats such as ransomware. In one example, the replication operation also provides protection from threats such as ransomware. In one example, the security operation may be integrated into or executed as part of the replication operation.

The local data 110 may be stored locally to the production site 102 or on-premise. The local data 110 may include data, virtual machines, applications, or any other configuration that may be replicated or protected. The cloud data 112 may include data stored in the cloud and may also include data of different types. The cloud data 112 may be stored as blocks, objects, or the like.

The replication appliance 104 may perform or direct snapshot operations in the production site 102 and then replicate the resulting snapshots. More specifically, the local data 110 and the cloud data 112 may be part of a single namespace. A namespace, by way of example, may be associated with a snapshot. The production site 102 may have multiple namespaces and may generate snapshots for each namespace. Each namespace could be replicated separately. In this example, a snapshot 116 of a namespace may include or reference both local data 110 and cloud data 112. The snapshot 116 thus references data spread across or located on different tiers.

In FIG. 1, the snapshot 116 is replicated to a vault 108, which stores the replicated data or snapshot 116 as backups 114. When multiple snapshots are stored or included in the backups 114, the production site 102 can recover to various points in time include a point in time that does not include corrupted or compromised data.

In this example, the vault 108, which may be an appliance similar to the appliance 104, is associated with an air gap 106. The air gap 106 functions such that the vault 108 is connected to a network or to the replication appliance 104 only when necessary. When replication is not being performed, the vault 108 is disconnected or separated from most or all network connections. More specifically, the network connections, after replication, with systems outside the vault is broken or stopped. There may be other connections with other systems in the vault that remain. This helps prevent the vault 108 from being the subject of a cyber-attack. In addition, a retention lock may be applied to the backups 114. This helps ensure that compromised data that may be replicated to the vault 108 in a given snapshot does not impact or affect previously stored copies, snapshot, or other backups 114.

If the snapshot were required to include all of the relevant local data 110 and cloud data 112, the replication of the data would experience issues when, for example, the cloud data 112 is not accessible or because the connection to the cloud data 112 is slower. More specifically, when the vault is providing cyber protection, which includes the air gap 106, the amount of time the production site 102 is connected to the vault 108 should be minimized.

The replication performed by the replication appliance 104 is configured to replicate a snapshot such that cyber threats are minimized or reduced by ensuring that the air gap 106 is open as little as possible. Generally, this is achieved by selectively replicating a snapshot. More specifically, the replication appliance 104 may not actually replicate the cloud data. The namespace metadata, however, would be replicated. This accounts for the fact that an attack on the production site 102 may not be occurring at the cloud data 112.

FIG. 2 illustrates an example of a data protection system that replicates multi-tier data from a production site to a target or destination site. FIG. 2 illustrates a replication appliance 208 configured to replicate data from both a production tier 202 and a cloud tier 212 to, in this example, a vault 210. However, the replication could be to a target destination in the cloud or another site and the vault 210 may not be associated with an air gap.

In one example, replication is performed based on a namespace basis. The namespace may be a logical partition of a filesystem, for example. In this example, the namespace 204 includes at least a part of the production tier 202, which is local to a production site, and a portion of a cloud tier 212, which is cloud-based.

In one example, the replication operation replicates a snapshot of the namespace by copying the namespace metadata 214 to the vault 210 during replication. The namespace metadata 214 references all of the data in the snapshot and includes metadata for the production tier 202 and metadata for the cloud tier 212. When replicating the data in the namespace 204, data from the cloud tier 212 is skipped and is not replicated from the cloud tier 212 to the vault 210. More specifically, as a file (block, chunk, etc.) is replicated, the source or location of the file is determined. If the location is the cloud tier 212, the data corresponding to the file is skipped and is not replicated. If the location is the production tier 202, the data 206 corresponding to the file is included and replicated to the vault 210.

As a result of this replication, the vault 210, for each snapshot, may include namespace metadata 214 and data 216. The namespace metadata 214 may reference data in the cloud tier/data 212 and in the local tier/data 206, but the data 216 does not include data from the cloud tier 212. The data 216 only includes the local data 206 corresponding to the snapshot or corresponding to the replication.

When storing the data 216, it may be necessary to adjust checksums or other verification methods associated with the snapshot to account for the data that was not retrieved from the cloud tier 212, which is not included in the data 216.

FIG. 3 illustrates an example method for replicating data. The method 300 includes a snapshot operation. Thus, the replication may begin after the snapshot is initiated and performed. The data corresponding to the snapshot or to the namespace can then be replicated. The elements of the method 300 may be performed in various orders and some elements may be performed concurrently. For example, an appliance may replicate the snapshot in batches, where each batch includes data and/or metadata.

In the method 300, the namespace metadata is replicated 302 by the replication appliance 208 to the vault 210. The namespace metadata 302 may point to the data in the production tier 202 and in the cloud tier 212 being copied or replicated. Because the data subject to the snapshot may include the local data 206 and data from the cloud tier 212, the namespace metadata 302 may point to locations in the production tier 202 and in the cloud tier 212.

The method 300 then replicates 304 the local or production tier 202. More specifically, this is achieved by copying the data 206 associated with the snapshot 218 to the vault 214. Data associated with the snapshot 218 that is located in the cloud tier 212 is skipped 306 and is not replicated or copied to the vault 210. After the snapshot 218 is replicated, the data 216 only includes data from the local data 206 in the local tier. Safeguards, such as checksums, are adjusted 308 to account for the skipped data from the cloud tier 212.

FIGS. 2 and 3 illustrate an example of providing data protection in the context of cyber threats. In many instances, because the production tier 202 is distinct (e.g., located at different locations) from the cloud tier 212, an attack on the production tier 202 may not impact the data in the cloud tier 212. As a result, the data in the production tier 202 is protected from threats such as ransomware. Advantageously, the snapshot-based replication is not impeded by latencies (read times, download times, etc.) associated with the cloud tier 212.

Advantageously, replication performed by the replication appliance 208 does not fall behind if the cloud tier 212 is not available or is slow. Further, the amount of time that the air gap is closed is controlled and not unnecessarily extended based on cloud connectivity and other cloud related latencies. Embodiments of the invention minimize and/or prevent any effect on the production site or namespace 204 in terms of namespace, resource usage, performance, and the like.

FIG. 4 illustrates an example of a recovery operation. In this example, the recovery operation operates to recovery the data from the vault (or other backup site). In this case, the data from the production tier is restored or recovered along with the namespace metadata. Once restored, the namespace metadata will point to the data in the cloud tier that already exists. In one example, the data in the cloud tier may have changed and the namespace metadata may not reference data that has changed. In other words, the backup of the namespace does not reference new data that may have been added. In one example, snapshots of the cloud are taken and, after recovery, those snapshots can be used for the data that is new or has changed. More specifically, to restore a consistent state from both the vault and the cloud, a recovered namespace may be reconciled with the cloud namespace, which could be a snapshot or a namespace change log (e.g., a journal of changes) that can be replayed or applied. The journal may store copies of the changes as the changes occurred. Thus, the cloud namespace can be recreated to an appropriate time using one or more of the journal entries. Thus, replaying the journal or a snapshot can result in a reconciled namespace.

When performing the recovery operation, the copy or snapshot being restored from the vault is made available. Once available, the namespace metadata is replicated 402 to the production site. The local data in the copy being recovered is replicated 404 to the production tier 404 from the vault. Data corresponding to the cloud tier is skipped 406 in the method 400 at least because the cloud data was not copied to the vault. Once the namespace data is restored, however, the cloud tier is available because the restored namespace data points to the data in the cloud tier.

Because the data from the cloud tier is not copied to the vault, this prevents the cloud data from being accessed from the vault. Even if a file pointing to the cloud tier is accessed on the vault, the attempt may fail because the vault may not have external or network access. As previously stated, the vault may be restricted such that only the source (e.g., the replication appliance 208) can access the vault.

Advantageously, embodiments of the invention allow snapshots or other data protection operations to be performed without copying data from the cloud tier to the vault. Because copying data from the cloud tier involves egress transactions, cost is incurred. The amount of time that the vault is open (the air gap is closed) is also reduced by embodiments of the invention. Further, local data can be replicated even when the cloud is not available.

In another example, embodiments of the invention may also protect the cloud tier against cyber threats such as ransomware. Stated differently, the cloud data may be replicated differently. FIG. 5 illustrates a method for replicating both the production tier and the cloud tier. Elements 502, 504, 506, and 508 are similar to elements 302, 304, 306, and 308 of FIG. 3 and have been previously described.

If there is a desire to protect the cloud tier from cyber threats in addition to the production tier, various operations can be performed on the cloud tier. For example, the snapshot may also trigger 510 cloud replication. For example, objects representing a file may be within the same region or regions and can be replicated to another target or region in the cloud. In one example, the cloud tier 212 may be replicated to another region (e.g., the cloud may have multiple regions as failure domains. These regions can be referred to or used during recovery. Alternatively, or in addition, versioning and retention locks are enabled 512 on the data in the cloud tier and/or on the replicated cloud data. This retention lock protects the cloud tier data and prevents the cloud tier data from being tampered with. Another example is where the vault is in the cloud, which means data is being replicated to the target appliance (e.g., virtual) in the cloud. In that case, the region for the source and the vault might be different. The option to create a protected cloud copy through in-cloud replication will bring a copy in the vault. Data transfer between the cloud regions through an appliance may not be necessary in this case.

In both 510 and 512, retention locks are applied 514 to the metadata of the filesystem and/or of the data. In other words, the cloud tier may be associated with the namespace metadata and/or with metadata specific to the cloud tier. This metadata stored in the cloud tier is subject to the retention lock.

These elements ensure that, if ransomware reaches the cloud tier via the replication appliance, the objects cannot be written to or deleted because of the retention locks.

Embodiments of the invention include replicating a namespace that has data in multiple tiers. In one example, the namespace of the replica is kept the same as the source so that failback can occur. In other words, snapshots make a copy of the namespace. This enables the ability to revert to a known namespace in the vault or at the production site in case of attack. Further, the namespace is kept consistent because there are references to the data in the cloud in the replicas (but no access in one example from the vault). There is no need, in one example, to directly reference the data in order to snapshot or replicate the namespace. When the snapshots or backups are stored in a vault, access to the data stored in the cloud tier is restricted from within the vault. Finally, cloud data, in addition to local data, can be protected against cyber threats such as ransomware.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. More generally, the scope of the invention embraces any operating environment in which the disclosed concepts may be useful.

At least some embodiments of the invention provide for the implementation of the disclosed functionality in existing backup platforms, examples of which include the Dell-EMC DataDomain storage environment and Retention Lock. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing and/or storage environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. The cloud storage may include public, hybrid, and/or private cloud.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups. Embodiments further apply to archives. Any data that is stored in a multi-tier appliance that may replicate to a vault can be used with embodiments of the invention.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: initiating a data protection operation at a production site, the data protection operation including a replication operation, replicating namespace metadata associated with a cloud tier and a production tier to a target site, wherein the namespace metadata identifies data in the production tier and data in the cloud tier, and replicating the data from the namespace to the target site, wherein data from the production tier is replicated to the target site and data from the cloud tier is not replicated to the target site, wherein the replicated data and the replicated namespace data comprise a backup.

Embodiment 2. The method of embodiment 1, further comprising taking a snapshot of the namespace and replicating the snapshot to the target site.

Embodiment 3. The method of embodiments 1 and/or 2, wherein the target site comprises a vault that is associated with an air gap that is closed only when replicating the data from the production tier and the namespace metadata to the vault.

Embodiment 4. The method of embodiments 1, 2 and/or 3, further comprising evaluating a location of data associated with the snapshot, wherein data is replicated when the location of the data is the production tier and wherein data is skipped when the location of the data is the cloud tier.

Embodiment 5. The method of embodiments 1, 2, 3, and/or 4, further comprising applying a retention lock to the backup in the target site.

Embodiment 6. The method of embodiments 1, 2, 3, 4, and/or 5, further comprising triggering a cloud-based replication of data in the cloud tier when performing the replication operation.

Embodiment 7. The method of embodiments 1, 2, 3, 4, 5, and/or 6, further comprising enabling versioning and retention locks in the cloud tier.

Embodiment 8. The method of embodiments 1, 2, 3, 4, 5, 6, and/or 7, further comprising applying retention locks to metadata associated with the replicated cloud data and replicated metadata associated with the cloud data.

Embodiment 9. The method of embodiments 1, 2, 3, 4, 5, 6, 7, and/or 8, further comprising recovering the backup from the vault by copying the namespace metadata to the production tier and copying the data associated with the production tier to the production tier.

Embodiment 10. The method of embodiments 1, 2, 3, 4, 5, 6, 7, 8, and/or 9, further comprising opening the target site to access the backup for a recovery operation.

Embodiments 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more or portions thereof of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, herein and/or elsewhere herein, may take the form of, or include, or be implemented on, or hosted by, a physical computing device. As well, where any of the aforementioned elements comprise or consist of a virtual machine (VM), that VM may constitute a virtualization of any combination of physical components.

For example, the physical computing device may include a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    initiating a recovery operation of a namespace using a backup of the namespace stored in a vault, wherein the backup includes local data and cloud metadata that are associated with a namespace, wherein cloud data identified by the cloud metadata is not included in the backup;
    recovering the namespace by copying the local data in the backup stored in the vault and the cloud metadata stored in the backup to a local tier without copying the cloud data to a cloud tier; and
    accessing the cloud data using the cloud metadata recovered to the local tier.

2. The method of claim 1, wherein the cloud metadata points to data in the cloud tier after being restored to the local tier.

3. The method of claim 2, further comprising recovering cloud snapshots to the cloud tier.

4. The method of claim 3, further comprising reconciling the cloud metadata and data in the cloud tier after recovering the cloud snapshots.

5. The method of claim 4, wherein the cloud snapshots are not stored in the vault and are stored in a different region of a cloud or in a different cloud.

6. The method of claim 2, further comprising reconciling the recovered cloud metadata based on changes in the cloud tier are stored in one or more snapshots or a journal of changes.

7. The method of claim 6, further comprising recreating the recovered cloud metadata to an appropriate point in time.

8. The method of claim 1, further comprising generating the backup of the namespace by:
    initiating a data protection operation at a production site, the data protection operation including a replication operation, wherein the production site includes a production tier that is local and a cloud tier that is different from the production tier;
    replicating namespace metadata associated with the cloud tier and the production tier to a target site, wherein the namespace metadata identifies data in the production tier and data in the cloud tier; and
    replicating the data from the namespace to the target site, wherein data from the production tier is replicated to the target site and data from the cloud tier is not replicated to the target site, wherein the replicated data and the replicated namespace metadata comprise a backup.

9. The method of claim 1, further comprising initiating the recovery operation when access to the vault is allowed by a controlled air gap.

10. A non-transitory storage medium having stored therein instructions that are executable by one or more hardware processors to perform operations comprising:
    initiating a recovery operation of a namespace using a backup of the namespace stored in a vault, wherein the backup includes local data and cloud metadata that are associated with a namespace, wherein cloud data identified by the cloud metadata is not included in the backup;
    recovering the namespace by copying the local data in the backup stored in the vault and the cloud metadata stored in the backup to a local tier without copying the cloud data to a cloud tier; and
    accessing the cloud data using the cloud metadata recovered to the local tier.

11. The non-transitory storage medium of claim 10, wherein the cloud metadata points to data in the cloud tier after being restored to the local tier.

12. The non-transitory storage medium of claim 11, further comprising recovering cloud snapshots to the cloud tier.

13. The non-transitory storage medium of claim 12, further comprising reconciling the cloud metadata and data in the cloud tier after recovering the cloud snapshots.

14. The non-transitory storage medium of claim 13, wherein the cloud snapshots are not stored in the vault and are stored in a different region of a cloud or in a different cloud.

15. The non-transitory storage medium of claim 11, further comprising reconciling the recovered cloud metadata based on changes in the cloud tier are stored in one or more snapshots or a journal of changes.

16. The non-transitory storage medium of claim 15, further comprising recreating the recovered cloud metadata to an appropriate point in time.

17. The non-transitory storage medium of claim 10, further comprising generating the backup of the namespace by:
    initiating a data protection operation at a production site, the data protection operation including a replication operation, wherein the production site includes a production tier that is local and a cloud tier that is different from the production tier;
    replicating namespace metadata associated with the cloud tier and the production tier to a target site, wherein the namespace metadata identifies data in the production tier and data in the cloud tier; and
    replicating the data from the namespace to the target site, wherein data from the production tier is replicated to the target site and data from the cloud tier is not replicated to the target site, wherein the replicated data and the replicated namespace metadata comprise a backup.

18. The non-transitory storage medium of claim 10, further comprising initiating the recovery operation when access to the vault is allowed by a controlled air gap.

* * * * *